Patented Feb. 25, 1930

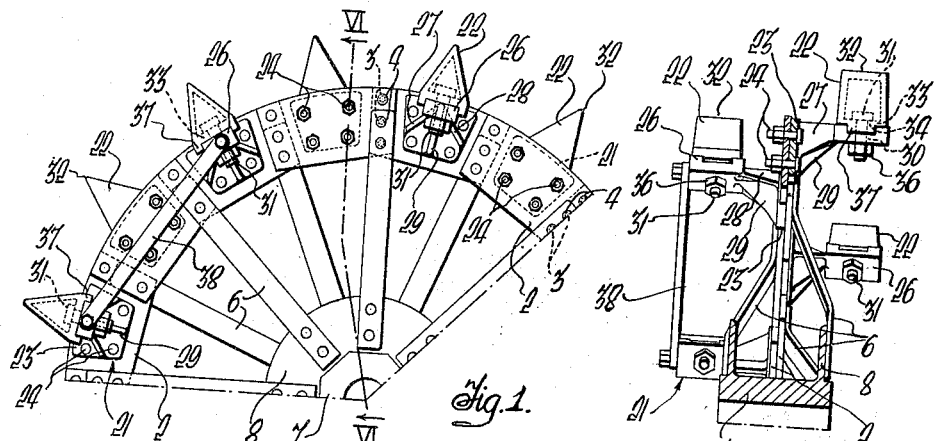

1,748,190

UNITED STATES PATENT OFFICE

DAVID RONALDSON, OF BALLARAT, VICTORIA, AUSTRALIA

WHEEL FOR TRACTORS, AGRICULTURAL IMPLEMENTS, AND THE LIKE

Application filed June 15, 1927, Serial No. 199,071, and in Australia June 24, 1926.

This invention relates to transport or land wheels for tractors, agricultural implements and such like vehicles, which are on occasions required to travel over, or to operate in relatively soft and muddy ground, and has especial reference to such wheels having a rim element which is relatively narrow and disposed edgewise to the ground.

One of the objects of the present invention is to provide an improved wheel for tractors and the like, the wheel being comparatively cheap to produce, capable of tracking effectively over soft or muddy ground without fear of becoming bogged, and, whilst being relatively light, possessing equal if not greater strength and rigidity than existing wheels.

A further object of the invention is to provide for tractor or like wheels having a relatively narrow rim element, an improved arrangement and construction of grippers and brackets for supporting said grippers at each side of the wheel rim, whereby an adequate tractive effect and tread surface will be obtained, whilst there will be not circumferentially extending surface between the grippers and brackets upon which mud and other objectionable matter can accumulate.

A characteristic feature of the invention resides in building up the rim of a wheel from a plurality of comparatively thin segmental plates which are assembled with their end portions overlapped, and are secured together and to the outer ends of the wheel spokes at said overlapped end portions. The segmental plates can be produced at a very low cost and may be speedily assembled by comparatively unskilled labor. Furthermore, by arranging for the end portions of the segmental plates to overlap each other and to be secured to the wheel spokes at said overlapped portions, the rim is effectively reinforced and the complete wheel structure rendered rigid whilst retaining the advantages of lightness.

The wheel is provided with spuds or grippers and these may be bolted directly to the rim or to brackets outstanding sidewardly therefrom. In the preferred embodiment of the invention, however, gripper supporting brackets are formed integral with the segmental plates, the grippers being attached to the outer ends of said integral brackets.

But in order that this invention may be better understood reference will now be made to the accompanying sheet of drawings which are to be taken as part of this specification and read herewith:—

Figure 1 is a fragmentary side elevation of a wheel according to an embodiment of the invention.

Figure 2 is a sectional view taken on the line VI VI of Figure 1.

Figure 3 is a fragmentary side elevation of a wheel according to another and perferred embodiment of the invention.

Figure 4 is a plan of Figure 3, supplementary grippers being omitted for convenience of illustration.

Figure 5 is an enlarged fragmentary section taken on the line IX IX of Figure 3.

Figure 6 is a sectional view taken on the line X X of Figure 5.

In accordance with this invention the segmental plates 2 for forming the rim of a tractor or like wheel may be stamped, pressed or otherwise conveniently fashioned, and are provided adjacent their ends with holes 3 to pass rivets or the like 4, whereby the plates may be secured together in the desired overlapped relationship, and to the outer end of the wheel spokes 6. Sets of the spokes may radiate from a hub 7 provided at both ends with flanges 8 to which the inner ends of the spokes are secured. The set of spokes secured to one of the flanges 8 are preferably staggered in relation to those secured to the other flange. Holes are formed through the spokes adjacent their outer ends to coincide with the holes 3 through the segmental plates 2.

In building up the rim according to this invention, a segmental plate 2 is placed with the holes 3 through one end portion in registration with the holes in the other end portion of a spoke 6. Another segmental plate is then applied so that one end of its end portions overlaps the end portion of the first plate, and with its rivet holes 3 in alignment with the holes of the said first plate and the spoke. Rivets 4 may then be applied to fasten the overlapped segmental plates to the spoke. Such assembly operations are repeated to complete the wheel structure. As seen in Figures 1 and 2, the opposite sets of spokes may be attached to opposite sides of the overlapped plates 2, or, as seen in Figures 3 to 5 the outer end portion of each spoke may be disposed between the overlapped end portion of adjacent segmental plates.

It will be evident that the outer peripheral edge 9 of the rim formed by the segmental plates 2 is relatively narrow, and to enable the wheel to establish a satisfactory tractive grip the rim is provided with grippers of suitable formation.

In the embodiment illustrated in Figures 1 and 2, brackets 21 are secured to the narrow rim which is built up of segmental plates 2 as aforesaid. The brackets 21 project sidewardly from the rim and to the outer end portion of each bracket a gripper 22 is attached. Each gripper supporting bracket may consist of a casting having an inner flange 23 adapted to lie flat against the side face of a segmental plate 2, the flange 23 and plate 2 being provided with holes to pass rivets or bolts 24. Projecting sidewardly and preferably at right angles from each flange 23 are webs which may terminate at their outer ends in a boss portion 26 adapted to receive a gripper 22. There may be two sidewardly projecting webs 27, 28, which when viewed in cross section are of substantially V shape, the junction of the web being furthest from the wheel centre and approximately flush with the outer periphery 9 of the rim. There may also be a third web 29 located between the V webs to strengthen the latter and the bracket generally. The outer boss portion 26 of the bracket may have a radially extending hole 30 to pass a bolt 31 for securing a gripper thereto.

Each gripper 22 may be of substantially rectangular shape when viewed from the front or rear of the wheel, and of substantially V shape when viewed from the side, and projects for a suitable distance outwardly beyond the rim element, the gripper thus having a relatively narrow ground engaging edge 32 which is spaced sidewardly from and extends at right angles to the rim element. The gripper may be substantially hollow and provided adjacent its base with a lug or web 33 having a hole or slot 34 to coincide with the bolt hole 30 of the outer bossed portion 26 of the bracket 21. One wall of the gripper may, if desired, have an opening to enable the bolt 31 to be passed through the said coinciding holes in the gripper 22 and bracket 21, a nut 36 being preferably applied to the bolt beneath the under surface of the bracket boss portion. The gripper may have lips or extensions 37 which extend from the base thereof and lie against opposite sides of the bossed portion 26 of the bracket to thereby steady the gripper. The brackets and grippers may be spaced at desired circumferential intervals around both sides of the rim element and preferably in staggered formation.

If desired, series of stays 38 may be bolted at their extremities to the boss portions 26 of the gripper brackets 21, as seen at the left hand side of Figures 1 and 2, in order to impart strength and steadiness thereto.

From the foregoing it will be evident that there is no circumferentially extending surface between the rows of grippers 22. Consequently, mud or loose earth cannot accumulate between or around the grippers. Furthermore, owing to the V shape of the sidewardly projecting webs of the brackets 21, mud or the like is not liable to be built up thereon nor upon the rim element.

In order to reduce manufacturing and assembling costs of the embodiment described with reference to Figures 1 and 2, whilst at the same time retaining the beneficial working results thereof, we prefer to form the brackets 21 integral with segmental plates 2.

Accordingly, we may provide a series of combined rim plate and gripper bracket units as seen in Figures 3 to 6, each unit preferably being in the form of a casting, comprising a relatively thin segmental plate portion $2^a$ and an outstanding integral bracket portion $21^a$ which is adapted at its outer end to receive a gripper $22^a$. The castings are assembled with the ends of their segmental plate portions $2^a$ overlapped, the overlapped ends being preferably disposed at opposite sides of the spokes 6, which radiate from the hub 7 as before mentioned. The plate portion $2^a$ and the spokes 6 are provided with holes 3 which coincide when the parts are assembled to accommodate rivets 4 or the like.

Each casting may have a single bracket portion $21^a$ and this preferably outstands at right angles from the respective plate portion $2^a$ and may be disposed nearer one end of the casting than the other. Each bracket portion $21^a$ is preferably of substantially triangular shape when viewed from the side of the wheel, the apex of the triangle being approximately flush with the outer peripheral edge of the rim. The inner end portion of the bracket $21^a$ may increase in cross sectional area to ensure adequate strength at its junction with the plate portion $2^a$. The bracket portion may if desired be hollow or partly hollow as seen in Figure 5.

Some of the castings may be of right hand and others of left hand formation so that when assembled the various gripper supporting bracket portions $21^a$ are disposed in suitably staggered formation around the wheel.

The grippers $22^a$ may be of substantially V shape when viewed from the side, and they may terminate at their inner ends in splayed portions or feet $37^a$ which bear against opposite inclined faces of the castings and steady the grippers. Each gripper may be secured to its supporting bracket 21ª by a bolt 31ª which passes through a radially extending hole 30ª in the outer end portion of said bracket, and a coinciding hole in a web 33ª of the gripper.

In some instances two rows of grippers disposed one at each side of the rim element may be sufficient to provide the required tractive grip, but, if desired, a further series of intermediate or supplementary grippers may be applied directly to the rim element, an intermediate gripper being located between two adjacent grippers of the outer rows thereof, as indicated in Figures 7 and 8. It will be evident that such intermediate or supplementary grippers may also be applied in the embodiments of the invention illustrated in Figures 1 and 2.

Referring to Figures 3 and 5 supplementary grippers are shown as comprising an attaching flange 52 which is adapted to lie flat against one side of the rim and to be secured thereto by bolts 53 or the like, and a body portion 54 of substantially V shape, when viewed from the side, which projects outwardly for a suitable distance beyond the outer periphery of the rim. An arcuate shoulder 56 may be formed at the junction of the body portion 54 and attaching flange 52, to contact with the outer edge of the rim and thus steady the supplementary gripper. The intermediate row of grippers supplement the tractive grip, and ensure an adequate tread surface for the wheel.

Having now described my invention what I claim as new and desire to secure by Letters Patent is:

1. Improvements in and relating to transport wheels for tractors and the like, characterized in that each wheel has a relatively narrow rim element built up of a series of metal plates of substantially segmental form which are assembled with their end portions overlapped and are secured together and to the outer ends of the wheel spokes at said overlapped portions, for the purpose specified.

2. Improvements in and relating to transport wheels for tractors and the like, as claimed in claim 1 wherein the overlapped end portions of said segmental plates and the outer end portions of said spokes are provided with coinciding apertures to accommodate rivets or bolts, for the purpose specified.

3. A transport wheel having a relatively narrow rim element, brackets secured to and projecting from the rim element in parallelism to the axis of the wheel, said brackets being substantially of V-form in cross section with their apices in the plane of the circumferential edge of the rim, and grippers interfitting with the brackets and removably secured thereto.

4. A transport wheel having a rim element made up of segmental plates secured together to present the edge of the plates as the rim of the wheel, a bracket carried by and projecting laterally of certain of the plates, the bracket being of V-form in cross section with its apex in line with the rim-forming edge of the plate, grippers interfitting with the brackets, said grippers being of less length axially of the wheel than the brackets, and means for securing the grippers to the brackets in spaced relation to the rim-forming plates.

In testimony whereof I affix my signature.

DAVID RONALDSON.